United States Patent
Stojkovic et al.

(10) Patent No.: US 11,254,367 B2
(45) Date of Patent: Feb. 22, 2022

(54) MOTOR VEHICLE WITH SCALABLE FRONT END ASSEMBLY

(71) Applicant: Ford Global Technologies, LLC, Dearborn, MI (US)

(72) Inventors: Dragan B. Stojkovic, Taylor, MI (US); Joshua Jacob Clement, Dearborn, MI (US); Shawn Michael Morgans, Chelsea, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 107 days.

(21) Appl. No.: 16/933,456

(22) Filed: Jul. 20, 2020

(65) Prior Publication Data
US 2022/0017150 A1 Jan. 20, 2022

(51) Int. Cl.
| | |
|---|---|
| *B62D 25/08* | (2006.01) |
| *B62D 27/02* | (2006.01) |
| *B62D 25/04* | (2006.01) |
| *B62D 21/03* | (2006.01) |

(52) U.S. Cl.
CPC ........... *B62D 25/085* (2013.01); *B62D 21/03* (2013.01); *B62D 25/04* (2013.01); *B62D 27/02* (2013.01)

(58) Field of Classification Search
CPC ...... B62D 25/085; B62D 21/03; B62D 25/04; B62D 27/02; B62D 21/02
See application file for complete search history.

(56) References Cited

U.S. PATENT DOCUMENTS

| | | | |
|---|---|---|---|
| 8,905,465 B2 | 12/2014 | Landholm et al. | |
| 9,422,010 B2 | 8/2016 | Boettcher et al. | |
| 2007/0176442 A1 | 8/2007 | Mori et al. | |
| 2017/0001667 A1* | 1/2017 | Ashraf | ................ B60K 1/00 |
| 2019/0152548 A1* | 5/2019 | Shimizu | ................ B62D 21/11 |

FOREIGN PATENT DOCUMENTS

| | | | | |
|---|---|---|---|---|
| CN | 110758562 A | | 2/2020 | |
| DE | 102012214558 A1 * | | 2/2013 | ........... B23K 33/008 |
| FR | 3026713 B1 | | 4/2016 | |

* cited by examiner

*Primary Examiner* — Lori L Lyjak
(74) *Attorney, Agent, or Firm* — David Coppiellie; Carlson, Gaskey & Olds, P.C.

(57) ABSTRACT

This disclosure relates to a scalable front end assembly for a motor vehicle. An example front end assembly includes a first component and a second component. The first component includes a first front cross member and the second component includes a second front cross member. The first front cross member overlaps the second front cross member. A method is also disclosed.

20 Claims, 4 Drawing Sheets

MOTOR VEHICLE WITH SCALABLE FRONT END ASSEMBLY

TECHNICAL FIELD

This disclosure relates to a scalable front end assembly for a motor vehicle.

BACKGROUND

Motor vehicles include reinforcement structures arranged at forward locations of the motor vehicle, such as in front of a dash panel. These structures, sometimes referred to as front ends or front end assemblies, serve a number of functions. Among them, front end assemblies transfer loads applied to the front of the vehicle rearwardly, such that those loads are absorbed by the vehicle frame, such as by the hinge pillar, A-pillar, etc.

SUMMARY

A motor vehicle according to an exemplary aspect of the present disclosure includes, among other things, a front end assembly including a first component and a second component. The first component includes a first front cross member and the second component includes a second front cross member. The first front cross member overlaps the second front cross member.

In a further non-limiting embodiment of the foregoing motor vehicle, an end section of the first front cross member includes a recess, and an end section of the second front cross member is arranged in the recess.

In a further non-limiting embodiment of any of the foregoing motor vehicles, the first front cross member includes a front, rear, top, and bottom wall, and three of the front, rear, top, and bottom walls extend beyond the other of the walls to provide the recess.

In a further non-limiting embodiment of any of the foregoing motor vehicles, the other of the walls is either the front wall or the top wall.

In a further non-limiting embodiment of any of the foregoing motor vehicles, width dimensions of the first front cross member and the second front cross member are tapered.

In a further non-limiting embodiment of any of the foregoing motor vehicles, a wall of the end section of the second front cross member includes an access opening.

In a further non-limiting embodiment of any of the foregoing motor vehicles, the wall of the end section of the second front cross member includes a plurality of access openings spaced-apart along the length of the second front cross member.

In a further non-limiting embodiment of any of the foregoing motor vehicles, an end section of the first front cross member is received over an end section of the second front cross member.

In a further non-limiting embodiment of any of the foregoing motor vehicles, the first front cross member includes a hollow cross-sectional opening at the end section of the first front cross member, and the end section of the second front cross member is sized so as to fit in in the hollow cross-sectional opening.

In a further non-limiting embodiment of any of the foregoing motor vehicles, a wall of the end section of the first front cross member includes an access opening, and a wall of the end section of the second front cross member includes an access opening configured to align with the access opening of the first front cross member.

In a further non-limiting embodiment of any of the foregoing motor vehicles, each of the first component and the second component includes a side section configured to connect to a hinge pillar of the vehicle, and a vertical section extending between the side section and a corresponding one of the first or second front cross members.

In a further non-limiting embodiment of any of the foregoing motor vehicles, each side section extends substantially parallel to a vehicle centerline, each vertical section extends substantially normal to a respective side section, and each of the first and second front cross members projects substantially normal to a respective vertical section in a direction toward the vehicle centerline.

In a further non-limiting embodiment of any of the foregoing motor vehicles, each side section includes a plurality of access openings spaced-apart from one another.

In a further non-limiting embodiment of any of the foregoing motor vehicles, the first front cross member and the second front cross member are mechanically joined.

In a further non-limiting embodiment of any of the foregoing motor vehicles, the first front cross member and the second front cross member are connected using fasteners or by welding.

An assembly for a motor vehicle according to an exemplary aspect of the present disclosure includes, among other things, a first hinge pillar, a second hinge pillar, a first component including a first side section connected to the first hinge pillar, a first vertical section, and a first front cross member projecting from the first vertical section. Further, the assembly includes a second component including a second side section connected to the second hinge pillar, a second vertical section, and a second front cross member projecting from the second vertical section. The first front cross member overlaps the second front cross member.

In a further non-limiting embodiment of the foregoing assembly, an end section of the first front cross member includes a recess, and an end section of the second front cross member is arranged in the recess.

In a further non-limiting embodiment of any of the foregoing assemblies, an end section of the first front cross member is received over an end section of the second front cross member.

A method according to an exemplary aspect of the present disclosure includes, among other things, overlapping an end section of a first cross member of a front end assembly of a motor vehicle with an end section of a second cross member of the front end assembly, and joining the first and second cross members.

In a further non-limiting embodiment of the foregoing method, the overlapping includes either inserting an end section of the second cross member into an end section of the first cross member or arranging the end section the second cross member in a recess of the end section of the first cross member.

DETAILED DESCRIPTION

This disclosure relates to a scalable front end assembly for a motor vehicle. An example front end assembly includes a first component and a second component. The first component includes a first front cross member and the second component includes a second front cross member. The first front cross member overlaps the second front cross member. The disclosed arrangement helps absorb vehicle loads by transferring them rearwardly to the other portions of the vehicle frame such as the hinge pillar, A-pillar, etc. Further, this disclosure permits scaling such that the disclosed arrangement can be used on vehicles of different sizes, thereby reducing manufacturing and tooling costs. These and other benefits will be appreciated from the below description.

Figure 1:
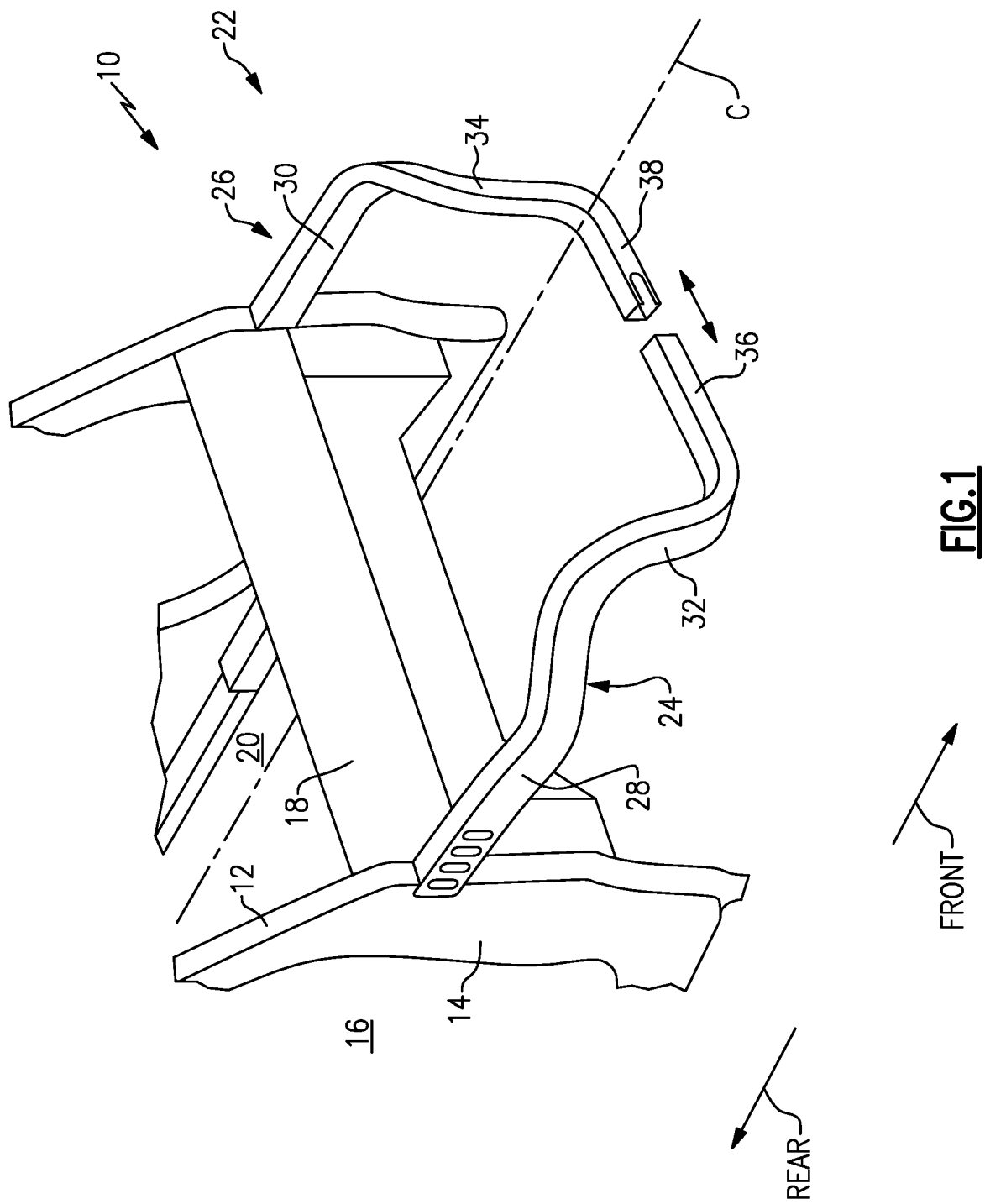
FIG. 1 is a partial side-perspective view of an example body structure for a motor vehicle.

FIG. 1 is a partial side-perspective view of a vehicle body structure 10 ("body structure 10") for a motor vehicle ("vehicle"). The body structure 10 includes, among other parts, an A-pillar 12 and a hinge pillar 14 (which is sometimes referred to as an A-pillar tower reinforcement) configured to connect to a door hinge. In FIG. 1, the A-pillar 12 and hinge pillar 14 partially circumscribe an opening 16, namely a passenger door opening. While the passenger side of the body structure 10 is shown and described relative to FIG. 1, it should be understood that the body structure 10 is substantially symmetrical about its centerline C, and that the body structure 10 includes substantially similar structures on the driver side of the body structure 10.

Between the passenger and driver sides of the body structure 10, the body structure 10 includes a dash panel 18, which includes a length dimension extending substantially normal to the centerline C. The dash panel 18 is a component of the body structure 10 that provides a front boundary of a passenger cabin 20. The "front" and "rear" directions are labeled in some figures for ease of reference. In one example, the dash panel 18 separates the passenger cabin 20 from an engine compartment. In other examples, such as when the body structure 10 is used in vehicles without an internal combustion engine, the dash panel 18 separates the passenger cabin 20 from a motor compartment and/or a front trunk ("frunk"). An instrument panel may be mounted to the dash panel 18.

Various structures are forward (i.e., in the "front" direction), or mostly forward, of the dash panel 18. Those structures are sometimes collectively referred to as the front end of the vehicle. In this disclosure, some components of a front end are referred to as a front end assembly 22. The front end assembly 22 performs a number of functions, including supporting, either directly or indirectly, various portions of an internal combustion engine (if present), the body panels of the vehicle, and a number of other structures, such as bumper mounts, a bumper, a grille, headlamps, a radiator, etc. The front end assembly 22 is also configured to transfer loads applied to the front of the vehicle, such as loads applied to the bumper and/or grille, to the A-pillar 12 and/or hinge pillar 14 where they are absorbed. In this respect, the front end assembly 22 provides a load path. In a particular aspect of this disclosure, the front end assembly 22 may provide a secondary load path, as the front end may include other structures that transfer loads to rearward portions of body structure 10.

In this disclosure, the front end assembly 22 includes a first component 24 and a second component 26 arranged generally on opposite sides of the centerline C. The first and second components 24, 26 are substantially mirror images of one another reflected about the centerline C, with various exceptions, which will be discussed below. The first and second components 24, 26 are connected to a respective hinge pillar adjacent the dash panel 18. The first and second components 24, 26 include a number of sections which will be described below. In one example, the first and second components 24, 26 are made of a metallic material. In a particular example, the material of the first and second components 24, 26 is aluminum (Al). While aluminum is mentioned, this disclosure extends to components made of other materials, however.

The first and second components 24, 26 are hollow in an example of this disclosure. In particular, the first and second components 24, 26 have relatively thin outer wall(s) and an empty interior space within the outer wall(s). In an example, the first and second components 24, 26 are formed by hydroforming. In another example, the first and second components are formed using another manufacturing technique, such as an extrusion process. Each of the first and second components 24, 26 may be integrally formed as a one-piece structure and then later mechanically joined to one another and to the hinge pillar 18.

Each of the first and second components 24, 26 includes a side section 28, 30 configured to connect to a hinge pillar, a vertical section 32, 34 extending downwardly, relative to a ground surface, from an opposite end of the side section 28, 30 as the hinge pillar, and respective first and second front cross member 36, 38. With the exception of the front cross members 36, 38, the first and second components 24, 26 are substantially mirror images of one another about the centerline C. The first component 24 will now be described in detail. Except where indicated, the description of the first component 24 applies to the second component 26.

Figure 2:
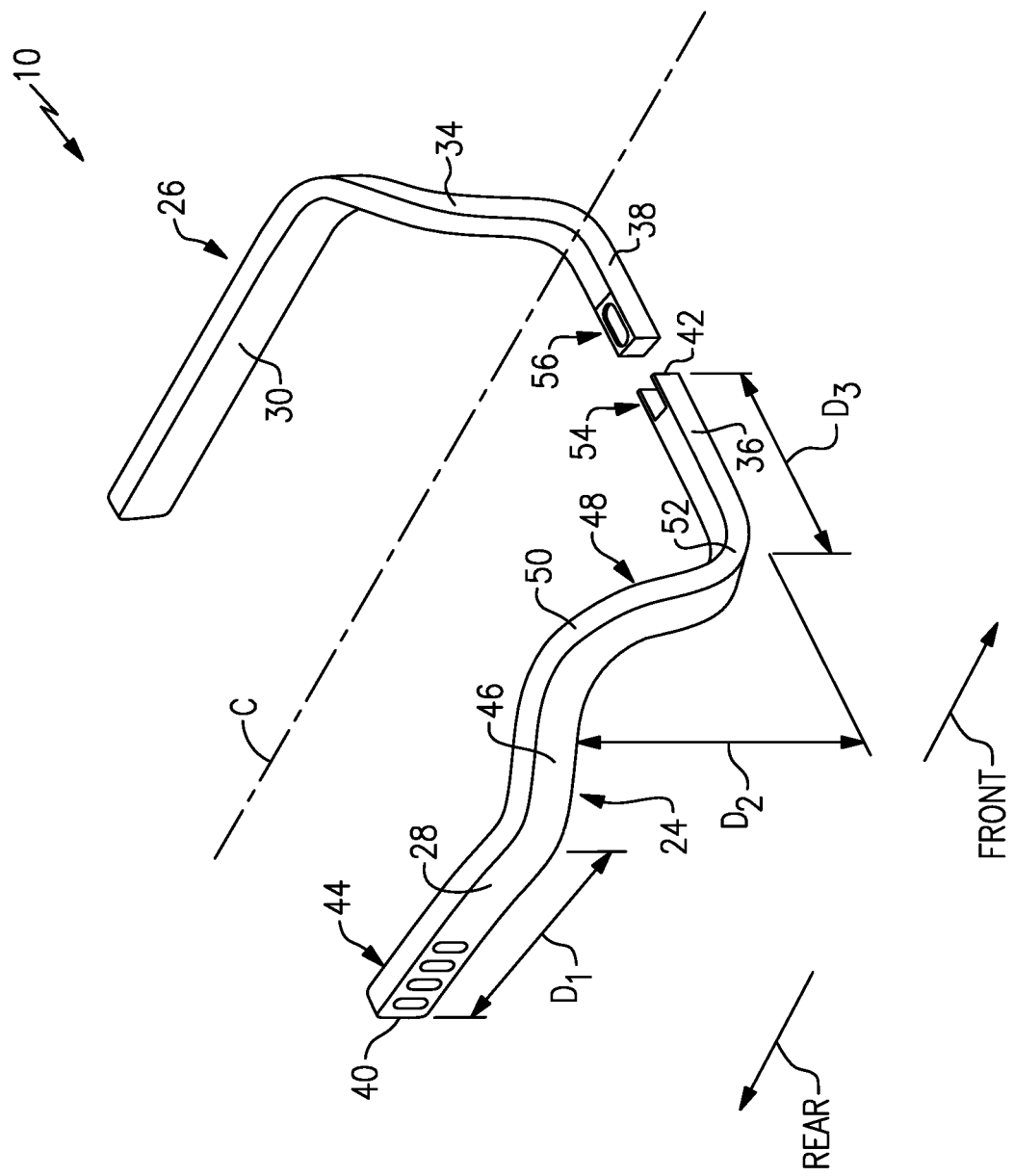
FIG. 2 is a side-perspective view of an example front end assembly.

With reference to FIG. 2, the first component 24 extends from a first free end 40 to a second free end 42. The term "free end" in this disclosure refers to the terminal end of a part, whereas "end section" is inclusive of the free end and an area adjacent the free end. The first component 24 is configured to connect to the hinge pillar 18 via an end section 44 adjacent the free end 40. The side section 28 extends a distance $D_1$ from the first free end 40 to a first curved section 46. Along the distance $D_1$, the side section is substantially parallel to the centerline C. The side section 28 is inclined vertically downward to a small degree, in some examples, between the first free end 40 and the curved section 46. The first curved section 46 is curved toward the centerline C and blends into a vertical section 48 which includes a second curved section 50 that is curved downward. The vertical section 48 extends generally downward in a direction parallel to the centerline C by a distance $D_2$ to third curved section 52, which is curved toward the centerline C.

The third curved section 52 leads to the first front cross member 36, which extends a distance $D_3$ toward the centerline C and terminates at the second free end 42. The second end section 54, which is adjacent to and includes the second free end 42, is configured to overlap with a corresponding second end section 56 of the second front cross member 38. The term overlap, as used herein, means that one component partly covers another.

In FIG. 2, the first and second front cross members 36, 38 do not contact one another. However, when assembled, one of the first and second cross members 36, 38 overlaps the other. Further, the first and second cross members 36, 38 are in contact with one another and are mechanically joined together using rivets or spot-welding, as examples. FIGS. 3-6 are representative of example techniques for overlapping the first and second cross members 36, 38 such that they may be mechanically joined.

Figure 3:
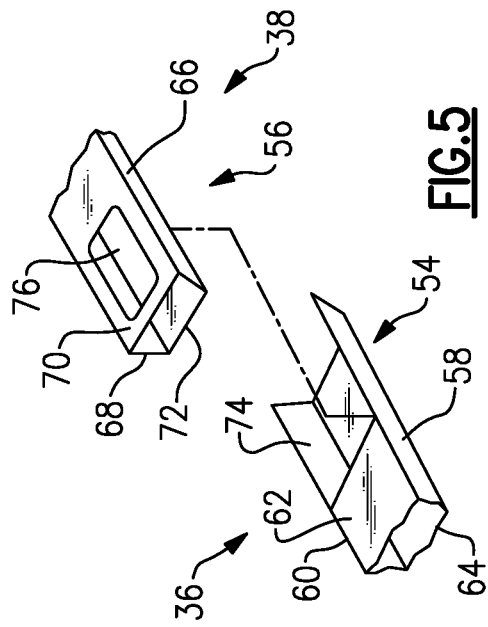
FIG. 3 is a view of a front portion of the example front end assembly, and illustrates a first example arrangement of front cross members of the front end assembly.

FIG. 3 is representative of a top-down overlap technique. In FIG. 3, the first front cross member 36 includes a front wall 58, rear wall 60, top wall 62, and bottom wall 64 adjacent the second end section 54. The second front cross member 38 likewise includes a front wall 66, rear wall 68, top wall 70, and bottom wall 72 adjacent the second end section 56. The second end section 54 includes a recess configured to receive the second end section 56. In particular, in this example, the top wall 62 is spaced-apart, in a direction away from the centerline C (i.e., in the left-hand direction in FIG. 3), from the second free end 42, whereas the rear wall 60, top wall 62, and bottom wall 64 extend beyond the top wall 62, in a direction toward the centerline C, and are coterminous with the second free end 42, such that a recess 74 is formed. The recess 74 is sized and shaped to receive the second end section 56. When the second end section 56 is in the recess 74, the second front cross member 38 can optionally slide in-and-out of the hollow cross-section of the first front cross member 36 to accommodate different vehicle widths. With the second end section 56 in the recess 74, the bottom walls 64, 72 contact one another. The second end section 56 includes an access opening 76 in the top wall 70 such that a tool can be positioned adjacent the bottom walls 64, 72 and mechanically join the bottom walls 64, 72, such as by riveting the bottoms walls 64, 72 together.

Figure 4:
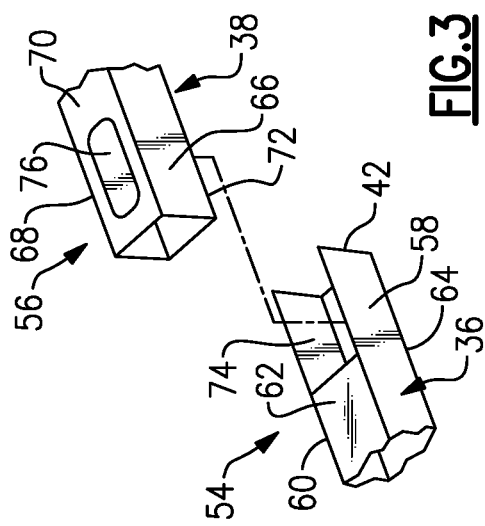
FIG. 4 is a view of the same portion of the example front end assembly as in FIG. 3, and illustrates a second example arrangement of the front cross members.

FIG. 4 is representative of a forward-rearward overlap technique. In FIG. 4, all walls of the second end section 54 except the front wall 58 are coterminous with the second free end 42, thereby providing a recess 78 sized and shaped to receive the second end section 56. With the second end section 56 arranged in the recess 78, the rear walls 60, 68 contact one another and can be mechanically joined. The second end section 56 can optionally slide in-and-out of the hollow cross-section of the first front cross member 36 to accommodate different vehicle widths. With the width set, the first and second front cross members 36, 38 can be mechanically joined together. Specifically, the front wall 66 includes an access opening 80 such that a tool can be positioned to provide the mechanical joint.

Figure 5:
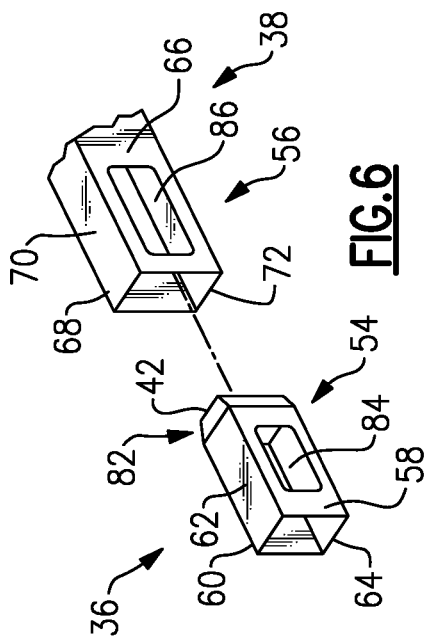
FIG. 5 is a view of the same portion of the example front end assembly as in FIGS. 3 and 4, and illustrates a third example arrangement of the front cross members.

In FIGS. 3 and 4, the first and second cross members 36, 38 are rectangular in cross-section at their second end sections 54, 56. In FIG. 5, the second end sections 54, 56 are non-rectangular in cross-section. Rather, the second end sections 54, 56 resemble trapezoids in cross-section. Specifically, FIG. 5 is another top-down overlap technique similar to FIG. 3, but the front and rear walls 58, 60, 66, 68 are inclined such that they move further away from one another as they lead away from their respective bottom wall 64, 72. Thus, a width dimension of the second end sections 54, 56 is tapered such that it gradually reduces leading from the top walls 62, 70 to the bottom walls 64, 72. The tapered width dimension may increase the ease of aligning second end sections 54, 56. The second end section 56 may slide in-and-out of the hollow cross-section of the first front cross member 36 before the first and second front cross members 36, 38 are mechanically joined.

Figure 6:
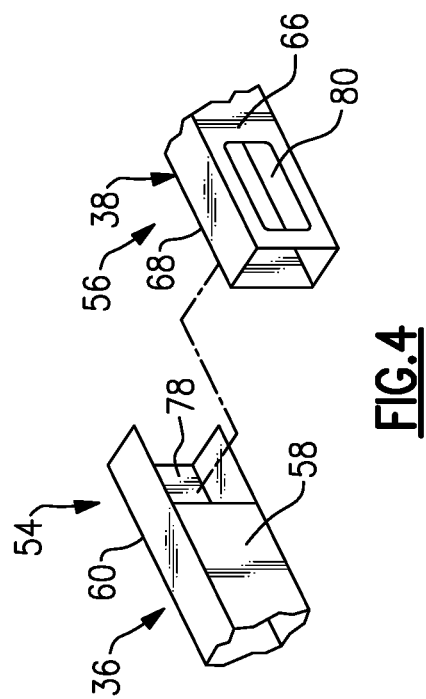
FIG. 6 is a view of the same portion of the example front end assembly as in FIGS. 3-5, and illustrates a fourth example arrangement of the front cross members.

FIG. 6 is representative of a telescoping overlap technique, and is similar to a slip joint. In FIG. 6, the second end section 54 is sized and shaped to be received in the recess defined by the hollow cross-section of the second end section 56. Specifically, the space between the front wall 66, rear wall 68, top wall 70, and bottom wall 72 is configured such that the second end section 54 can fit therein by moving in a direction normal to the centerline C. In an example, the second end section 54 includes a tapered section 82 which gradually reduces in dimension leading to the second free end 42. The tapered section 82 assists with fitting the second end section 54 into the hollow cross-section of the second end section 56. Access openings 84, 86 formed in the front walls 58, 66 are configured to align when the second end section 54 is inserted into the second end section 56 to assist with arranging a tool such that the rear walls 60, 68 may be mechanically joined.

The overlapping techniques described above are exemplary. While the recesses 74, 78 in FIGS. 3-5 are in the first front cross member 36, they could be in the second front cross member 38. Likewise, while first front cross member 36 is received in the second front cross member 38 in FIG. 6, the second front cross member 38 could be configured to be received in the hollow cross-section of the first front cross member 36.

Figure 7:
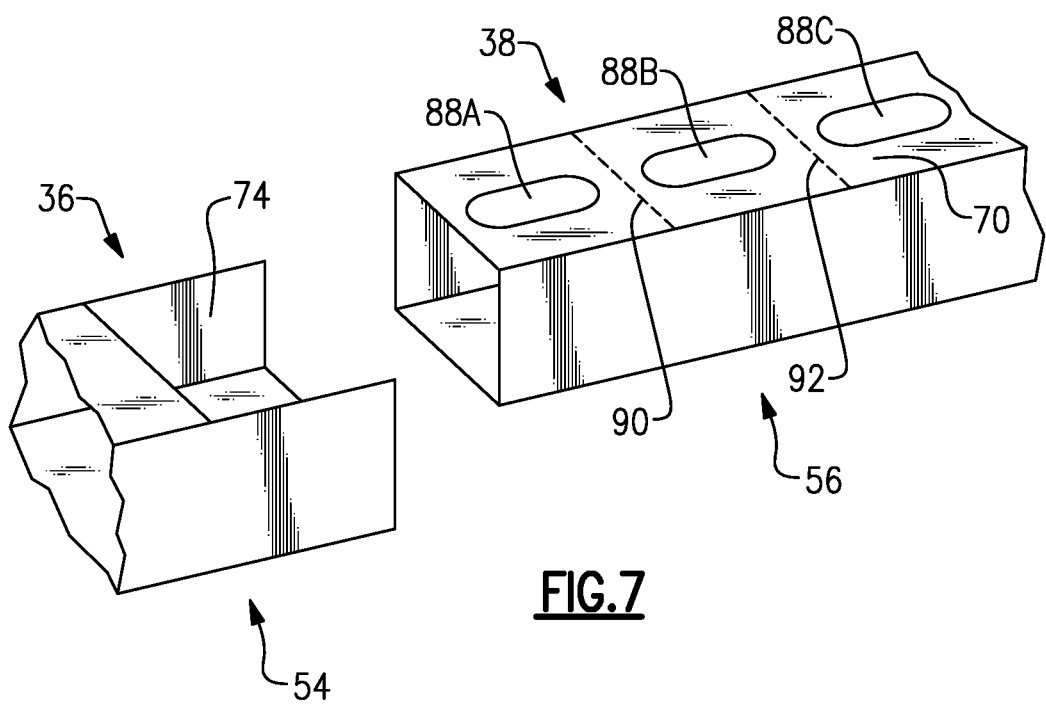
FIG. 7 is a view of the same portion of the example front end assembly as in FIGS. 3-6, and illustrates a fifth example arrangement of the front cross members.

In an example, before mechanically joining the first and second front cross members 36, 38, the second front cross member 38 is trimmed to accommodate a particular vehicle width. In that example, a wall of the second front cross member 38 may include a plurality of access openings spaced-apart along the length of the second front cross member 38. In FIG. 7, a top wall 70 of the second front cross member 38 includes a plurality of access openings 88A-88C spaced-apart from one another along the length of the second front cross member 38. Before positioning the second front cross member 38 in the recess 74, the second front cross member 38 may be cut at a first location 90 to remove a portion of the length of the second front cross member 38, leaving the access opening 88B to facilitate the mechanical joint between the first and second front cross members 36, 38, or at a second location 92 for an even narrower vehicle, leaving only the access opening 88C. There may be additional or fewer access openings in the second front cross member 38. The access openings do not need to be provided in the top wall. Any of the embodiments of FIGS. 3-6 may benefit from the inclusion of a plurality of access openings, providing a user with an option for trimming the front end assembly 22 to vehicles of varying widths.

Figure 8:
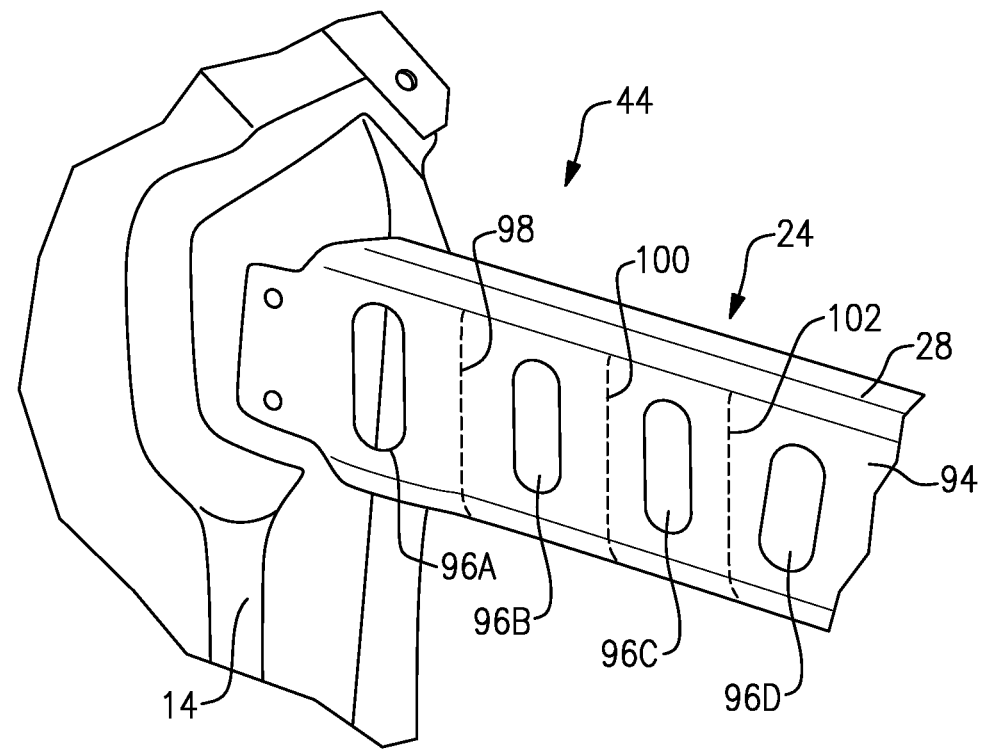
FIG. 8 is a side-perspective view of a portion of the example front end assembly, and illustrates detail of the front end assembly adjacent an interface with a hinge pillar.

To accommodate vehicles of different lengths, the first and second components 24, 26 may also be cut or trimmed to size at another location. In a particular aspect of this disclosure, relative to FIG. 8, an outer wall 94 (i.e., away from the centerline C) of the side section 28 includes a plurality of access openings 96A-96D adjacent the first end section 44. The access openings 96A-96D are spaced-apart from one another along the length of the side section 28. The access openings 96A-96D permit one to arrange a tool relative to the first component 24 and the hinge pillar 18 to mechanically join the two by riveting, as one example. The side section 28 can be cut at one of the locations 98, 100, 102 while still leaving at least one of the access openings 96A-96D to facilitate the mechanical joint.

It should be understood that terms such as "about," "substantially," and "generally" are not intended to be boundaryless terms, and should be interpreted consistent with the way one skilled in the art would interpret those terms. It should also be understood that directional terms such as "front," "rear," "side," etc., are used herein relative to the normal operational attitude of a vehicle for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
a front end assembly including a first component and a second component, wherein the first component includes a first front cross member and the second component includes a second front cross member, wherein the first front cross member overlaps the second front cross member.

2. The motor vehicle as recited in claim 1, wherein:
an end section of the first front cross member includes a recess, and
an end section of the second front cross member is arranged in the recess.

3. The motor vehicle as recited in claim 2, wherein:
the first front cross member includes a front, rear, top, and bottom wall, and
three of the front, rear, top, and bottom walls extend beyond the other of the walls to provide the recess.

4. The motor vehicle as recited in claim 3, wherein the other of the walls is either the front wall or the top wall.

5. The motor vehicle as recited in claim 3, wherein width dimensions of the first front cross member and the second front cross member are tapered.

6. The motor vehicle as recited in claim 3, wherein a wall of the end section of the second front cross member includes an access opening.

7. The motor vehicle as recited in claim 6, wherein the wall of the end section of the second front cross member includes a plurality of access openings spaced-apart along the length of the second front cross member.

8. The motor vehicle as recited in claim 1, wherein an end section of the first front cross member is received over an end section of the second front cross member.

9. The motor vehicle as recited in claim 8, wherein:
the first front cross member includes a hollow cross-sectional opening at the end section of the first front cross member, and
the end section of the second front cross member is sized so as to fit in in the hollow cross-sectional opening.

10. The motor vehicle as recited in claim 9, wherein a wall of the end section of the first front cross member includes an access opening, and a wall of the end section of the second front cross member includes an access opening configured to align with the access opening of the first front cross member.

11. The motor vehicle as recited in claim 1, wherein each of the first component and the second component includes:
a side section configured to connect to a hinge pillar of the vehicle, and
a vertical section extending between the side section and a corresponding one of the first or second front cross members.

12. The motor vehicle as recited in claim 11, wherein:
each side section extends substantially parallel to a vehicle centerline,
each vertical section extends substantially normal to a respective side section, and
each of the first and second front cross members projects substantially normal to a respective vertical section in a direction toward the vehicle centerline.

13. The motor vehicle as recited in claim 11, wherein each side section includes a plurality of access openings spaced-apart from one another.

14. The motor vehicle as recited in claim 1, wherein the first front cross member and the second front cross member are mechanically joined.

15. The motor vehicle as recited in claim 14, wherein the first front cross member and the second front cross member are connected using fasteners or by welding.

16. An assembly for a motor vehicle, comprising:
a first hinge pillar;
a second hinge pillar;
a first component including a first side section connected to the first hinge pillar, a first vertical section, and a first front cross member projecting from the first vertical section; and
a second component including a second side section connected to the second hinge pillar, a second vertical section, and a second front cross member projecting from the second vertical section, wherein the first front cross member overlaps the second front cross member.

17. The assembly as recited in claim 16, wherein:
an end section of the first front cross member includes a recess, and
an end section of the second front cross member is arranged in the recess.

18. The assembly as recited in claim 16, wherein an end section of the first front cross member is received over an end section of the second front cross member.

19. A method, comprising:
overlapping an end section of a first cross member of a front end assembly of a motor vehicle with an end section of a second cross member of the front end assembly; and
joining the first and second cross members.

20. The method as recited in claim 19, wherein the overlapping includes either inserting an end section of the second cross member into an end section of the first cross member or arranging the end section the second cross member in a recess of the end section of the first cross member.

* * * * *